United States Patent Office 3,542,875
Patented Nov. 24, 1970

3,542,875
PURIFICATION AND RECOVERY OF N-3-OXOHY-DROCARBON-SUBSTITUTED ACRYLAMIDES
Allen J. Raymond, Kirtland, Ohio, assignor to The Lubrizol Corporation, Wickliffe, Ohio, a corporation of Ohio
No Drawing. Filed Oct. 17, 1967, Ser. No. 675,794
Int. Cl. C07c *103/62*
U.S. Cl. 260—561       7 Claims

ABSTRACT OF THE DISCLOSURE

N-3-oxohydrocarbon-substituted acrylamides, especially N - (1,1 - dimethyl-3-oxobutyl)acrylamide (diacetone acrylamide), are isolated in good yield and high purity by extraction from the reaction mixture with an organic solvent, followed by heating the extract with aqueous alkali to neutralize residual acidity and remove by-products.

---

This invention relates to the production of N-3-oxo-hydrocarbon-substituted acrylamides, and more particularly to a method for the isolation of said N-3-oxohydrocarbon-substituted acrylamides from the reaction mixtures in which they are produced. The invention is particularly applicable to methods for the preparation of compounds of the formula

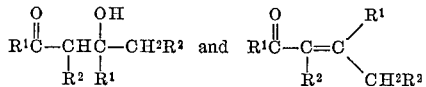

wherein $R^1$ is a hydrocarbon radical; $R^2$ is hydrogen or a hydrocarbon radical; and $R^3$ is hydrogen or a lower alkyl radical, whereby one mole of an unsaturated nitrile of the formula

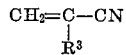

is reacted with at least about one mole of a β-hydroxy aldehyde or ketone or an α,β-unsaturated aldehyde or ketone of the respective formulas

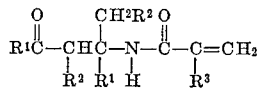

or with at least about two moles of an aldehyde or ketone of the formula

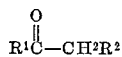

in the presence of at least one mole of sulfuric acid, and whereby the reaction mixture is extracted with a water-immiscible organic solvent to recover the N-3-oxohydrocarbon-substituted acrylamide therefrom.

According to this invention, the organic solution of the N-3-oxohydrocarbon-substituted acrylamide is heated at about 50–100° C. with aqueous alkali for a sufficient time to neutralize residual acidity therein and remove therefrom by-products which are acidic or which are hydrolyzed by alkali, and the N-3-oxo-hydrocarbon-substituted acrylamide is then recovered from said organic solution.

N - 3 - oxohydrocarbon-substituted acrylamides are described in U.S. Pat. 3,277,056. That patent also describes methods for their preparation by the reaction of an unsaturated nitrile with an aldehyde or ketone, or a dimeric self-condensation product thereof, in the presence of sulfuric acid. The products are useful as monomers for conversion to polymers having a number of interesting properties.

The reaction of the nitrile with the oxo-compound (aldehyde, ketone or self-condensation product thereof) is best carried out under "plug flow" conditions—that is, under conditions where the reaction mixture passing by a given point in the system has attained a relatively constant stage of reaction completion, said stage of completion being roughly proportional to the distance the mixture at that point has traveled through the system. These conditions may be attained by carrying out the reaction in a series of vessels, the reaction mixture passing from one vessel to the next in continuous flow. The reaction may, if desired, be initiated in a suitable heat exchanger before passing into the first of said vessels.

When N-3-oxohydrocarbon-substituted acrylamides are prepared as described above, they must be isolated from a strongly acidic reaction mixture. In one method for isolation of the product, ice or an ice-water mixture is added, followed by sufficient basic reagent to neutralize substantially all of the sulfuric acid. Care is taken during this process to maintain the temperature below about 100° C., preferably about 0–70° C. The desired product may easily be recovered from this neutralized solution (e.g., by extraction) and may then, for example, be purified by recrystallization from a suitable solvent, or by a combination of distillation and recrystallization. For example, N-(1,1-dimethyl-3-oxobutyl)acrylamide may be obtained by reacting two (or more) moles of acetone with one mole of acrylonitrile in the presence of at least about two moles of sulfuric acid, diluting the reaction mixture with up to an equal weight of cold water, neutralizing with anhydrous ammonia, separating and drying the crude organic phase, and extracting this phase with warm n-heptane. Upon cooling the n-heptane solution, the pure N-(1,1-dimethyl-3-oxobutyl)acrylamide crystallizes and may be easily recovered.

In a preferred recovery method, the reaction mixture is diluted and neutralized as above and is simultaneously or subsequently extracted with a water-immiscible solvent, preferably an aromatic hydrocarbon or chlorinated aliphatic hydrocarbon such as benzene, toluene, xylene, chloroform, carbon tetrachloride or ethylene dichloride. In still another method, the acidic reaction mixture is diluted and extracted without neutralization.

All of these methods involve removal of product from solvent, generally by distillation. At the elevated temperatures preferred for distillation, a tendency of the product to decompose or dissociate into acrylamide, mesityl oxide and the like has been noted. Therefore, methods have been sought to maximize product yield and purity by suppressing such decomposition and removing the by-products formed thereby.

A principal object of the present invention, therefore, is to provide an improved method for the separation of N-3-oxo-hydrocarbon-substituted acrylamides from their reaction mixtures.

Still another object is to provide a method by which N-3-oxohydrocarbon-substituted acrylamides can be recovered in good yield with a minimum of decomposition.

Other objects will in part be obvious and will in part appear hereinafter.

For the sake of convenience, and because N-(1,1-dimethyl-3-oxobutyl)acrylamide (diacetone acrylamide) is the compound of greatest current interest, the remainder of this specification will deal with this compound. It is to be understood, however, that the method is equally applicable to other N-3-oxohydrocarbon-substituted acrylamides, such as N-(1,3-diphenyl-1-methyl-3-oxopropyl)acrylamide and N - (1 - methyl - 1 - ethyl - 3 - oxopentyl)acrylamide.

The basis for the present invention is the discovery that residual acidity in the organic extract may be high enough to cause decomposition of a portion of the product, even when the reaction mixture is neutralized prior to extraction. While mere washing of the organic solution with an alkaline reagent is not effective to reduce the acidity enough to prevent decomposition, reduction of this acidity is accomplished by heating the mixture of the organic solution and the aqueous alkaline reagent at 50–100° C.

In a preferred embodiment of the method of this invention, the diacetone acrylamide reaction mixture (usually diluted with water) is reacted with sufficient alkali to raise its pH to at least about 7.5, preferably at least 9. The term "alkali" as used herein includes ammonium hydroxide, which may be added in aqueous solution or as ammonia gas, in addition to sodium and potassium hydroxides and other known alkaline materials. Anhydrous ammonia is often preferred by reason of the ease with which it may be introduced into the mixture.

The neutralized reaction mixture is extracted with a suitable solvent; the most suitable solvents are those named hereinabove. Often, part of the solvent may be recycled or recovered from earlier runs; this is particularly advantageous in connection with continuous processes. The organic solution containing the diacetone acrylamine is contacted with aqueous alkali (usually diluted alkali of about 10% concentration), preferably sodium, potassium or ammonium hydroxide, and is heated therewith at about 50–100° C. for a sufficient time to effect neutralization of residual acidity and removal of such impurities as acrylamide and acrylic acid (both of which are transferred to the aqueous layer as the alkali metal or ammonium acrylate). Generally, the desired neutralization can be accomplished in less than one hour, frequently about 30 minutes. The preferred temperature is about 50–85° C. In no event should the temperature substantially exceed 100° C., since alkaline hydrolysis of diacetone acrylamide may be effected at higher temperatures.

Following the alkali treatment, the diacetone acrylamide is recovered from the organic solution by any convenient means, such as removal of solvent by distillation or precipitation of product by addition of a non-solvent therefor.

The invention is illustrated by the following example in which a circulating reactor is charged with 1520 parts by weight of a mixture of 1380 parts of acetone and 420 parts of acrylonitrile, and with 2035 parts of 93% sulfuric acid. The reactor temperature is maintained at 60–62° C. The mixture is passed through a heat exchanger at 56–59° C. for 4½ hours, and is then cooled to 45° C. and fed through a continuous neutralizer over 4.2 hours. During this time, water is fed to the neutralizer at the rate of 775 parts per hour, and toluene mother liquor from a previous run is fed in at the rate of 200 parts per hour. To this mixture is added liquid anhydrous ammonia at a rate sufficient to maintain a pH of 8.1–8.4 in the effluent stream. The temperature in the neutralizer is maintained between 66° and 96° C.

The effluent is collected in a reaction vessel at 66–73° C., and 140 parts of toluene mother liquor is added. The mixture is allowed to settle into aqueous and organic layers and the upper (organic) layer is washed with 55 parts of 10% aqueous sodium hydroxide solution for 30 minutes at 71° C. The organic layer is then removed and the toluene is evaporated; there is obtained 830 parts (73.5% of the theoretical amount) of diacetone acrylamide.

In addition to neutralizing residual acidity and thus avoiding excessive decomposition of diacetone acrylamide, the present method is effective to remove impurities and allows the recovery of a product of high purity.

What is claimed is:

1. In a method for the preparation of N-(1,1-dimethyl-3-oxobutyl)acrylamide whereby 1 mole of acrylonitrile is reacted with at least 1 mole of diacetone alcohol or mesityl oxide, or with at least 2 moles of acetone, in the presence of at least 1 mole of sulfuric acid, and whereby the reaction mixture is neutralized by addition of sufficient alkali to raise its pH to at least about 7.5 and subsequently extracted with a water-immiscible organic solvent to recover the N-(1,1-dimethyl-3-oxobutyl)-acrylamide therefrom, the improvement which consists of heating the organic solution of said N-(1,1-dimethyl-3-oxobutyl)acrylamide at 50–100° C. with aqueous alkali to neutralize the residual acidity therein and to remove therefrom by-products which are acidic or which are hydrolyzed by alkali, and recovering said N-(1,1-dimethyl-3-oxobutyl)acrylamide from said organic solution.

2. In a method for the preparation of N-(1,1-dimethyl-3-oxobutyl)acrylamide whereby 1 mole of acrylonitrile is reacted with at least 1 mole of diacetone alcohol or mesityl oxide, or with at least 2 moles of acetone, in the presence of at least 1 mole of sulfuric acid, and whereby the reaction mixture is extracted with a water-immiscible organic solvent to recover the N-(1,1-dimethyl-3-oxobutyl)acrylamide therefrom, the improvement which comprises heating the organic solution of said N-(1,1-dimethyl-3-oxobutyl)acrylamide at 50–100° C. with aqueous alkali to neutralize the residual acidity therein and to remove therefrom by-products which are acidic or which are hydrolyzed by alkali, and recovering said N-(1,1-dimethyl-3-oxobutyl)acrylamide from said organic solution.

3. The method of claim 2 wherein the reaction mixture is neutralized by addition of sufficient alkali to raise its pH to at least about 7.5, prior to extraction with said organic solvent.

4. The method of claim 3 wherein the organic solvent is toluene.

5. The method of claim 3 wherein the organic solution is heated with the aqueous alkali at about 50–85° C. for a period not greater than one hour.

6. The method of claim 3 wherein part of the solvent is recycled from an earlier run.

7. The method of claim 6 wherein the organic solvent is toluene, the aqueous alkali is an approximately 10% sodium hydroxide solution, and the organic solution is heated with said aqueous alkali at about 50–85° C.

References Cited
UNITED STATES PATENTS

| | | | |
|---|---|---|---|
| 3,277,056 | 10/1966 | Coleman | 260—63 |
| 3,425,942 | 2/1969 | Coleman | 260—561 XR |

ALEX MAZEL, Primary Examiner

J. A. NARCAVAGE, Assistant Examiner

U.S. Cl. X.R.

20—562

UNITED STATES PATENT OFFICE
CERTIFICATE OF CORRECTION

Patent No. 3,542,875               Dated November 24, 1970

Inventor(s) Allen J. Raymond

It is certified that error appears in the above-identified patent and that said Letters Patent are hereby corrected as shown below:

Column 4, lines 31-32, "comprises" should read --consists of--; lines 38-41 (claim 3) should be cancelled entirely; claims 4-7 should be numbered as claims 3-6, respectively; claims 3-5 (as renumbered) should be dependen upon claim 1; and claim 6 (as renumbered) should be depende upon claim 5.

Signed and sealed this 3rd day of August 1971.

(SEAL)
Attest:

EDWARD M. FLETCHER, JR.             WILLLAM E. SCHUYLER, JR
Attesting Officer                   Commissioner of Patents